United States Patent [19]

Conrad

[11] 4,286,910
[45] Sep. 1, 1981

[54] PERISTALTIC VALVE FOR TRANSFERRING MATERIAL BETWEEN ZONES

[75] Inventor: Lucas J. Conrad, Winston-Salem, N.C.

[73] Assignee: R. J. Reynolds Tobacco Company, Winston-Salem, N.C.

[21] Appl. No.: 125,730

[22] Filed: Feb. 28, 1980

[51] Int. Cl.³ .............................................. F16K 7/10
[52] U.S. Cl. .................................. 414/221; 100/221; 222/450; 406/198; 251/61.1
[58] Field of Search ................ 100/221; 414/221, 217, 414/786; 222/212–214, 450, 442; 251/61.1; 406/96, 128, 192, 198

[56] References Cited

U.S. PATENT DOCUMENTS

| | | | |
|---|---|---|---|
| 2,673,011 | 3/1954 | Rood et al. | 222/207 |
| 2,732,980 | 1/1956 | Öholm | 222/427 |
| 2,829,600 | 4/1958 | Sveda | 103/45 |
| 2,889,892 | 6/1959 | Schaub | 183/85 |
| 3,212,671 | 10/1965 | Rock | 222/1 |
| 3,433,245 | 3/1969 | Cymbalisty | 137/242 |
| 3,491,922 | 1/1970 | Mylting | 222/450 X |
| 3,654,959 | 4/1972 | Kassel | 137/605 |
| 3,862,780 | 1/1975 | Senn | 302/36 |
| 4,025,121 | 5/1977 | Kleysteuber et al. | 406/96 |
| 4,060,183 | 11/1977 | Puurunen | 222/442 |

FOREIGN PATENT DOCUMENTS 177277  6/1953  Austria ................................... 222/450

Primary Examiner—Trygve M. Blix
Assistant Examiner—Terrance L. Siemens
Attorney, Agent, or Firm—Grover M. Myers

[57] ABSTRACT

The method of transferring the material between a first and second zone having different atmospheres of a first and second fluid utilizing spaced sealing members and a liner extending between sealing members, said sealing members and liner adapted to be manipulated in a sequence to permit the material to pass from the first zone to the second zone without an admixing of the atmosphere.

10 Claims, 11 Drawing Figures

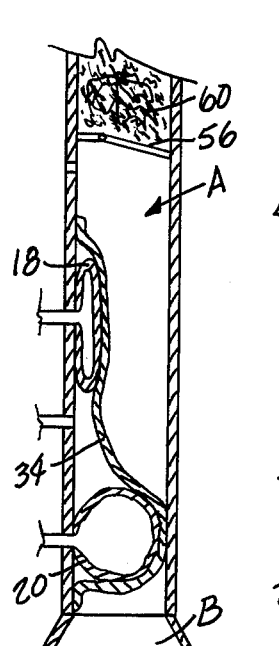
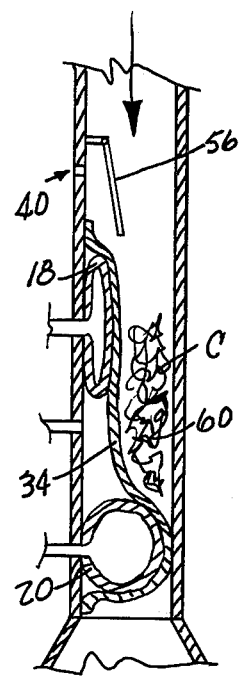
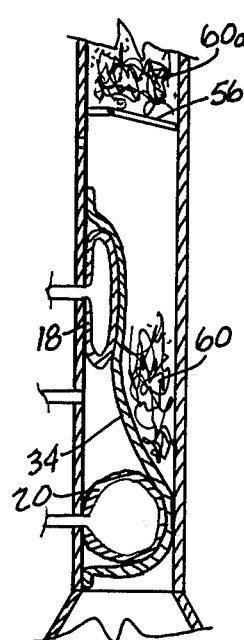
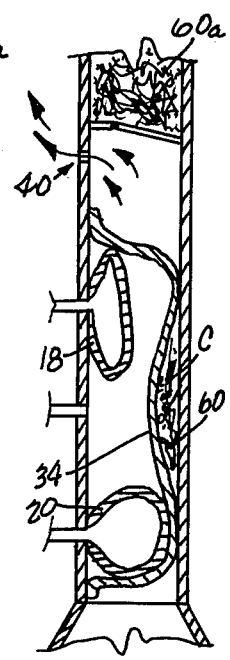
FIG.4A    FIG.4B    FIG.4C    FIG.4D
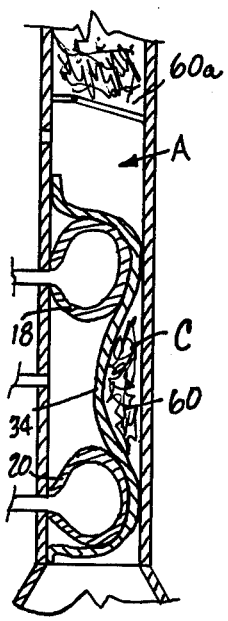
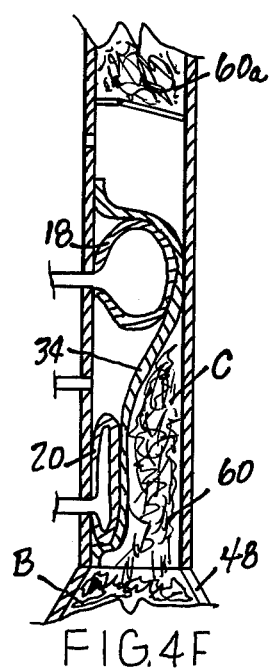
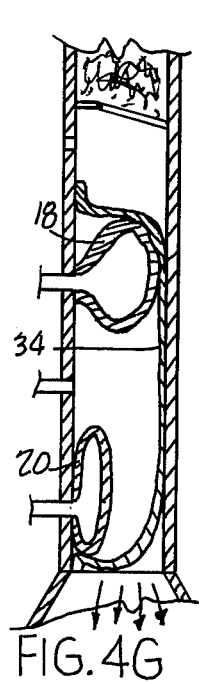
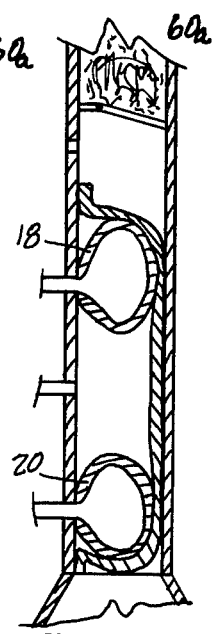
FIG.4E    FIG.4F    FIG.4G    FIG.4H

PERISTALTIC VALVE FOR TRANSFERRING MATERIAL BETWEEN ZONES

TECHNICAL FIELD

This invention relates to a peristaltic valve for transferring bulk or particulate materials between atmospheres or zones containing different fluids at the same or different pressures without a significant mixing of the fluids.

BACKGROUND OF THE INVENTION

There are numerous processes and transfer situations where a material must be transferred between zones having different fluids and/or the same or different pressures without a significant mixing of the fluids or communication of the different zones. An example of such a situation is a material being placed in a chute or hopper at atmospheric pressure in the presence of air and being transferred into a processing unit or system having a different gaseous atmosphere or pressure above or below atmospheric. A specific sitution is found in the tobacco industry where it is desirable to transfer a quantity of pliable cut tobacco filler at atmospheric pressure from a chute into a closed processing system which contains a gaseous processing fluid at a pressure above atmospheric pressure without the introduction of significant quantities of air.

One type of device commonly used for this purpose is a so-called rotary valve or rotary feeder. Generally, a rotary feeder includes a housing carrying a rotary element which has a member of pockets that rotate successively past an inlet opening in the housing through which materials can be introduced into the pockets. The pockets then rotate past a discharge outlet where the materials exit the feeder. The rotor is sealed around the inlet and, thus, the different pressures and atmospheres existing between the inlet and the outlet of the rotary valve are maintained. Although these rotary feeders give satisfactory service with some materials and under certain conditions, there are a number of situations where the materials are abrasive so that the interface between the rotor and the inlet seal becomes worn and the seal is destroyed in a relatively short time.

Another type of valve for use in similar situations uses elastic elements. For example, the valve can have two or more inflatable diaphragms which are normally deflated to permit material to pass and inflated to a sealing engagement with a co-acting valve seat member. Another elastic element valve uses a tubular diaphragm which is pinched closed to stop the passage of the material.

The pinched type diaphragm is subjected to relatively quick deterioration of the elastic element, in that, it is bent and pinched into distortion and highly stressed conditions on each operation. The inflatable diaphragm valves are not suitable in situations where there is high pressure on one side of the valve so that, when it is opened, a flow is created into the low pressure area of the valve. Thus, if the material is passed through the valve from the low to a high pressure zone, it must flow counter to the back flow of fluid and is subject to high turbulence, a loss of flow rate, and other detrimental effects.

One inflatable sealing valve has been developed to overcome the pressure problem by using a three-tiered inflatable diaphragm structure having two zones through which the material must pass to equalize the pressure between zones. Such a valve is illustrated in U.S. Pat. No. 3,491,922. The primary drawback to this valve is its complexity and its inability to substantially eliminate the admixing of the fluids in the different zones.

SUMMARY OF THE INVENTION

It is, therefore, an object of this invention to provide a valve which will permit the transfer of materials between zones of the same or different pressures.

Another object of this invention is to provide a valve which will permit the transfer of materials between zones having different gaseous atmospheres without a substantial admixing of the gases.

These and other objects of the present invention are accomplished through the use of a valve housing having three inflatable elements carried in the housing. Two of the inflatable elements are separated and cooperate with the housing to form a sealed zone while the third inflatable element encompasses or circumscribes the other two inflatable elements. The third inflatable element is used to force fluids from the zone after it has been charged with a material and before the sealing of the valve and, subsequently, to force fluid from the valve zone after the material has been discharged from the valve zone and before sealing of the valve zone.

BRIEF DESCRIPTION OF THE DRAWINGS

FIGS. 4A–4H are a series of diagrammatic illustrations of the operating cycle of the peristaltic valve according to the present invention.

DESCRIPTION OF A PREFERRED EMBODIMENT

Figure 1:
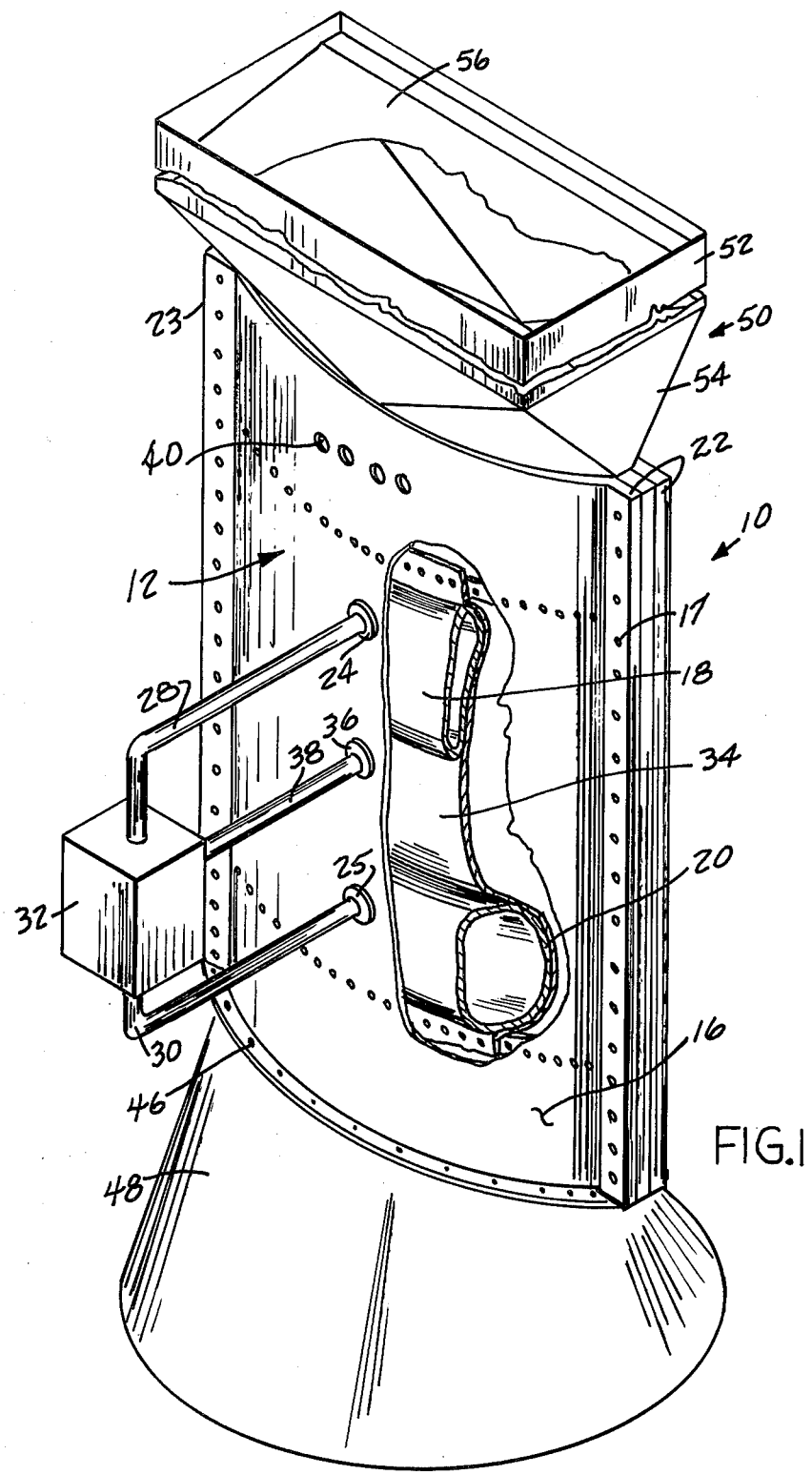
FIG. 1 is a perspective of a peristaltic valve according to the present invention.
Figure 2:
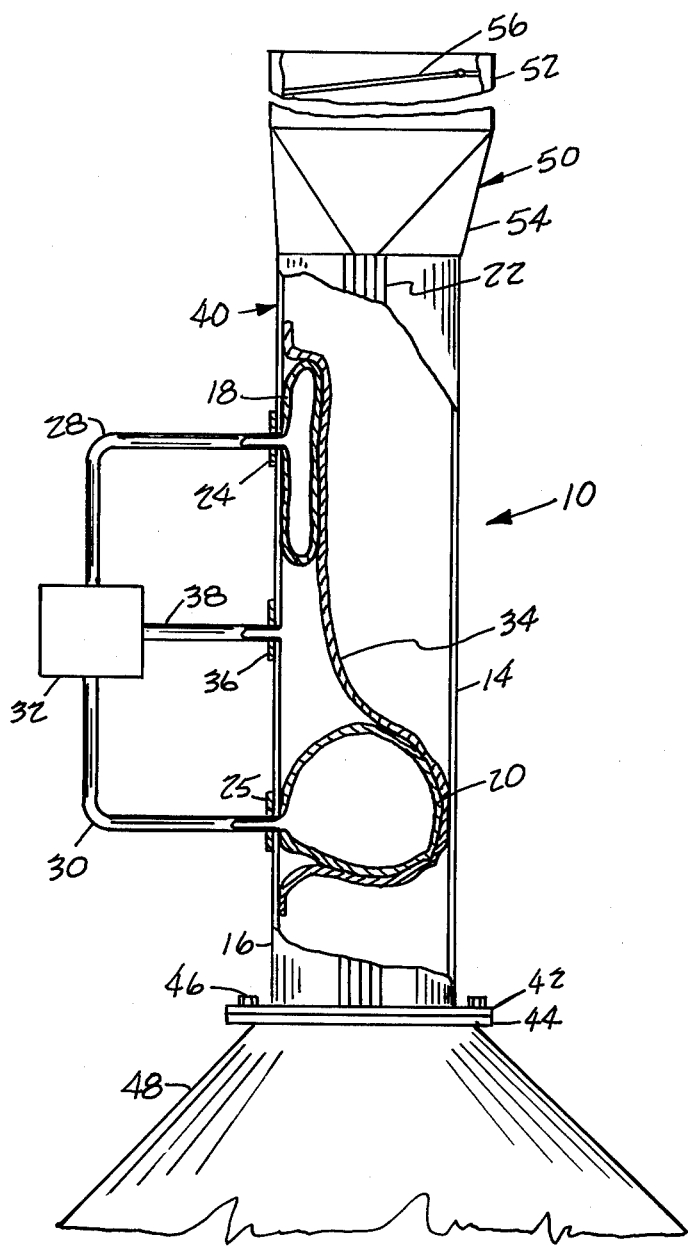
FIG. 2 is a cross-section view taken along line 2—2 of FIG. 1.

In FIG. 1, the numeral 10 indicates a peristaltic valve according to the present invention. In this preferred embodiment, the housing or throat 12 of the valve is constructed of two generally semi-elliptical elongated shell sections 14 and 16 (see FIG. 2) which, when secured together by suitable fasteners 17, form a tubular conduit having an elliptical cross section. The shell sections will normally be made from steel, however, the material for which these sections are made is of no great consequence. Although an elliptical cross section is not absolutely essential, it does provide the most preferred cross section for ease of filling the voids by the inflatable members hereafter described.

Within the throat or housing 12 are spaced upper and lower inflatable elements or tubes 18 and 20, respectively, which are flexible but essentially non-elastic. Each tube is secured into position by the flanges 22 and 23 of the steel sections and fasteners 17. Fittings 24 and 26 extend through shell 16 (see FIG. 2) into the upper and lower inflatable tubes, respectively, and provide an air-tight connection. Any suitable fittings known in the art may be utilized. Tubing lines or conduits 28 and 30 extend from the fittings 24 and 26, respectively, into a fluid pressure control unit 32 which can be operated to supply a positive pressure or produce a slightly negative pressure in the inflatable tubes.

Circumscribing the upper and lower inflatable tubes is an inflatable envelope or liner 34. The liner is flexible as well as being elastic to insure that it will conform to the configuration of the housing and the material between the sealing tubes during the valve operation. The liner is secured to the shell 16 above the upper tube and extends below the lower tube where it is again secured to the shell 16. The interfaces between the liner and shells are hermetically sealed. A fitting 36 is provided through the shell 16 to communicate with the interior of the liner and is connected to tubing line 38 which, in turn, is connected to the pressure control unit 32. Located above the upper sealing tube 18 and the upper side of the liner 34 in the shell section 16 are a plurality of vent apertures 40.

The valve 10 has a lower flange 42 which is secured to a flange 44 by fasteners 46 of the infeed section 48 of a processing system. Attached to the top of the valve housing is a feed hopper 50 which has a generally rectangular upper portion 52 and a generally elliptical transition section 54 which is inserted into the upper end of the elliptical-shaped valve housing. The rectangular portion of the valve has a hinged door or gate 56 which is operated by suitable control means to open and close, thereby permitting the material or a charge 60 to pass from the hopper into the valve at selected times.

Figure 3:
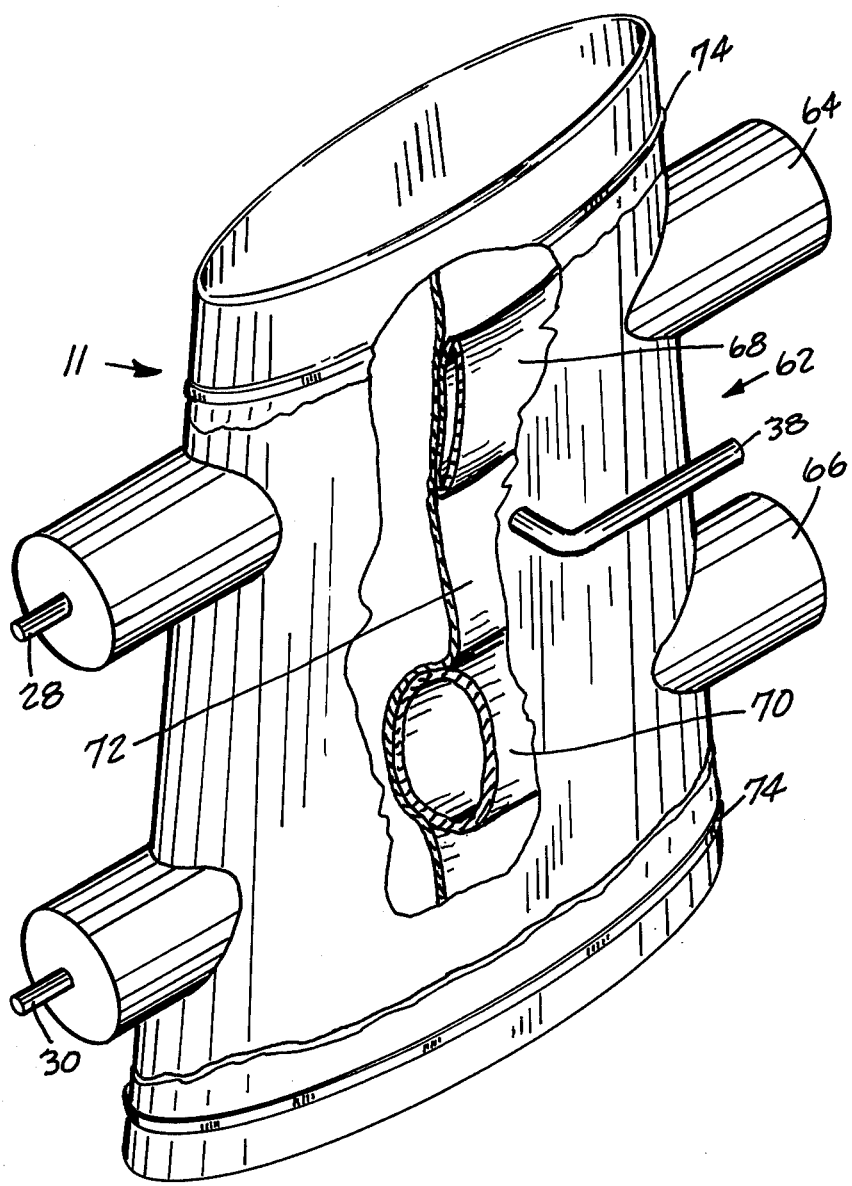
FIG. 3 is a perspective of another embodiment of the peristaltic valve according to the present invention.

The valve 11, illustrated in FIG. 3 has a one-piece body 62 having upper and lower protrusions 64 and 66, respectively, to receive the right circular cylinder sealing members 68 and 70. The liner 72 is an elastic, flexible tube which is rolled over the upper and lower ends of the body and secured by bands 74 or other suitable securing means. This configuration of the valve permits the liner to be changed more easily.

Operation

FIGS. 4A through 4H illustrate a sequential or step-by-step method of operation of the valve 10 or 11. In FIG. 4A, which illustrates the valve prior to the introduction of material, the inflatable members of the valve are in the following condition. The lower sealing tube 20 is inflated having a positive pressure and co-acts with the housing to seal zone A from zone B. The liner or envelope 34 and the upper sealing tube are deflated or collapsed having a negative pressure thereon. Although the pressures used in the tube and liner during the operation of the valve will depend on the particular environment in which the valve is used, in the tobacco transfer situation mentioned above the sealing tube normally has a positive pressure of about 2.11 kg/cm² gage and a negative pressure of about −0.352 kg/cm² gage while the liner has either a positive pressure of 0.352 kg/cm² or a negative pressure of −0.352 kg/cm². After the inflatable members are set up as described above, the hinged door or gate 56 is opened (see FIG. 4B) and the material 60 falls by gravity into the valve in the space between the sealing members 18 and 20 or zone C. The gate closes (see FIG. 4C) and further material 60a, is prevented from falling into the valve by the closing of gate 56. In the next step, envelope or liner 34 is pressurized so that air, which has entered the valve (zone C) with the charge 60 is forced from zone C out through vents 40 and the charge is captured between the envelope and the housing (see FIG. 4D). The upper sealing tube 18 is then inflated or pressurized to seal zone A from zone C. (see FIG. 4E). At this point, as can be seen in FIG. 4F, the lower sealing tube and the liner are collapsed by the application of a negative pressure so that the charge 60 falls by gravity into the processing system infeed section 48 or zone B. Any vapors in the processing system (zone B) would, of course, fill zone C. To remove these vapors, the liner 34 is pressurized again to force the vapors out of zone C into the processor (see FIG. 4G). The lower sealing tube (see FIG. 4H) is again pressurized to seal zone B from zone C. Following pressurization of the lower sealing tube 20, the upper sealing tube and liner are collapsed, as in FIG. 4A, and the valve is prepared to receive another charge of material 60a.

As can be seen from the above description and drawings, the present peristaltic valve permits the transfer of material between zones having the same or different pressures and permits the transfer of material between different gaseous atmospheres without a substantial admixing of the atmospheres.

What I claim is:

1. A method of transferring material between first and second zones having different atmospheres of a first and second fluid, respectively, utilizing a valve having spaced sealing members and a liner element extending beyond the spaced sealing members comprising the steps of:
   (a) manipulating said first sealing member to seal said first zone from the space between said sealing members and said second zone;
   (b) charging the space between the sealing members with material from the second zone;
   (c) manipulating the liner to force the second fluid from the space between the sealing members into the second zone;
   (d) manipulating the second sealing member to seal said second zone from the space between said sealing members and said first zone;
   (e) manipulating the first sealing member and the liner to permit the material to move into the first zone;
   (f) manipulating the liner to force the fluid from the space between the first and second sealing members into the first zone;
   (g) manipulating the first sealing member to seal said first zone from the space between said sealing members and said second zone; and
   (h) manipulating the second sealing member and liner to permit passage of material into said space between the sealing members from said second zone.

2. The method of claim 1, wherein steps b to h are repeated.

3. A method of transferring material between a first and second zones having different atmospheres of a first and second fluid and the same or different pressures, respectively, comprising the steps of:
   (a) providing a valve between the first and second zones having first and second inflatable, spaced sealing members and an inflatable envelope circumscribing said spaced sealing members;
   (b) pressurizing the first sealing member to seal the first zone from the space between the sealing members and the second zone;
   (c) charging the space between the sealing members with material from the second zone;
   (d) pressurizing the envelope to force the fluid from the space between the sealing members into the second zone;
   (e) pressurizing the second sealing member to seal the second zone from the space between the sealing members and the first zone;

(f) collapsing the first sealing member and the envelope to permit material to move into the first zone; and
(g) pressurizing the envelope to force the fluid from the space between the first and second sealing members into the first zone.

4. A valve for transferring material between first and second zones having first and second fluid atmospheres, respectively, comprising:
(a) a housing;
(b) first and second sealing means secured in a spaced relationship in said housing for co-acting with the housing to seal the valve and prevent the passage of fluids between said first and second zones; and
(c) envelope means circumscribing said first and second sealing means for forcing the fluid from said space between said sealing members, said envelope means and said first and second sealing means functioning at selected times during the operation of the valve.

5. The valve of claim 4, wherein said envelope means is inflatable and will contact the housing when inflated and, wherein said first and second sealing means are inflatable members which will engage and seal against the envelope and housing to prevent the passage of fluid, and means for selectively pressurizing said first and second sealing means and said envelope.

6. The valve of claim 5, wherein said housing is tubular and has a generally elliptical-shaped cross-section, and said first and second sealing members are generally tubular in configuration.

7. The valve of claims 4 or 5, wherein said inflatable sealing members are flexible and non-elastic and said envelope is flexible and elastic.

8. A peristaltic valve for transferring particulate material between a first and second zone having first and second fluid atmospheres, respectively, without substantial admixing of the fluids, comprising:
(a) a tubular housing having a generally elliptical-shaped cross-section;
(b) first and second inflatable sealing members secured within said tubular housing in a spaced relationship, said sealing members cooperating with said housing to prevent the passage of fluid between zones upon inflation to a selected pressure;
(c) an inflatable envelope member circumscribing said first and second inflatable sealing members which is secured to said housing, said inflatable envelope contacting said housing and filling the space between said first and second sealing members upon inflation to a selected pressure; and
(d) means for selectively applying a positive or negative pressure to said envelope member and said first and second sealing members.

9. A peristaltic valve of claim 8, wherein said sealing members are flexible and non-elastic and generally tubular in configuration and said envelope is flexible and non-elastic.

10. A peristaltic valve for transferring material between first and second zones having different pressures comprising:
(a) a housing;
(b) a first and second sealing member secured in a spaced relationship within said housing for sealing the valve and prevent the communication of the different pressure zones; and
(c) an envelope means circumscribiing said first and second sealing means for cooperating with the housing to eliminate fluid from the space between the sealing members during the functioning of the valve.

* * * * *